(12) United States Patent
Schiava et al.

(10) Patent No.: US 8,381,663 B2
(45) Date of Patent: Feb. 26, 2013

(54) PLATE-LIKE ELEMENT FOR SUPPORTING OR BEARING AN OBJECT, AND METHOD FOR PRODUCTION OF THE SAME

(75) Inventors: Martin Schiava, St. Salvator (AT); John Richard France, Hollywell (AU); Martin Klatzer, Moosburg (AT); Klaus Lubitsch, St. Veit/Glan (AT)

(73) Assignee: Hirsch Maschinenbau GmbH, Glanegg (AT)

( * ) Notice: Subject to any disclaimer, the term of this patent is extended or adjusted under 35 U.S.C. 154(b) by 383 days.

(21) Appl. No.: 12/452,584

(22) PCT Filed: Jun. 26, 2008

(86) PCT No.: PCT/AT2008/000234
§ 371 (c)(1),
(2), (4) Date: Mar. 11, 2010

(87) PCT Pub. No.: WO2009/006654
PCT Pub. Date: Jan. 15, 2009

(65) Prior Publication Data
US 2010/0186639 A1    Jul. 29, 2010

(30) Foreign Application Priority Data
Jul. 10, 2007   (AT) .................................. 1067/2007

(51) Int. Cl.
*B65D 19/38*   (2006.01)
*B29C 45/00*   (2006.01)
*B29C 43/00*   (2006.01)

(52) U.S. Cl. ...................... 108/57.27; 264/510; 264/571

(58) Field of Classification Search .... 108/57.25–57.28, 108/51.11; 264/510, 511, 553, 554, 571, 264/468, 46.8, 86, 87, 526, 566, 568, 101
See application file for complete search history.

(56) References Cited

U.S. PATENT DOCUMENTS

| | | | | |
|---|---|---|---|---|
| 2,991,600 A | * | 7/1961 | Lancaster | 53/433 |
| 3,067,082 A | * | 12/1962 | Leigh | 156/84 |
| 3,914,104 A | * | 10/1975 | Dean et al. | 425/397 |
| 4,828,637 A | * | 5/1989 | Mentzer et al. | 156/212 |
| 4,851,070 A | * | 7/1989 | Shimada | 156/293 |
| 4,879,956 A | * | 11/1989 | Shuert | 108/53.3 |
| 5,023,042 A | * | 6/1991 | Efferding | 264/511 |
| 5,034,077 A | * | 7/1991 | Pata | 156/84 |
| 5,108,529 A | * | 4/1992 | Shuert | 156/214 |
| 5,401,456 A | * | 3/1995 | Alesi et al. | 264/511 |
| 5,791,262 A | * | 8/1998 | Knight et al. | 108/57.25 |
| 6,021,721 A | * | 2/2000 | Rushton | 108/56.3 |
| 2005/0263044 A1 | | 12/2005 | Bearse | |
| 2011/0005433 A1 | * | 1/2011 | Pichereau | 108/55.1 |

FOREIGN PATENT DOCUMENTS

| | | |
|---|---|---|
| EP | 0 520 508 | 12/1992 |
| EP | 1 500 599 | 1/2005 |

* cited by examiner

*Primary Examiner* — Janet M Wilkens
*Assistant Examiner* — Timothy M Ayres
(74) *Attorney, Agent, or Firm* — Jacobson Holman PLLC

(57) ABSTRACT

A plate-like element for supporting or bearing an object, with a core of generally rectangular shape and composed of a foamed plastic. The core is covered at least on both surfaces by a plastic film of impact-resistant material. A connection of the plastic films, which cover the core on both surfaces, is formed in the region of a peripheral side edge of the core between a surface of the core and an adjoining, peripheral border of the core. A plate-like element which receives a corresponding load can be reliably produced by simple method steps.

5 Claims, 5 Drawing Sheets

PLATE-LIKE ELEMENT FOR SUPPORTING OR BEARING AN OBJECT, AND METHOD FOR PRODUCTION OF THE SAME

This is a national stage of PCT/AT08/000234 filed Jun. 26, 2008 and published in German, which has a priority of Austria no. A 1067/2007 filed Jul. 10, 2007, hereby incorporated by reference.

FIELD OF THE INVENTION

The present invention relates to a plate-shaped or plate-like element for supporting or carrying or bearing an object, including a core of foamed plastic having a generally rectangular shape, said core being, in particular holohedrally, covered with a plastic sheet or film of high-impact material at least on its two surfaces, wherein a connection of the plastic sheets or films covering the core on its two surfaces is formed in the region of a peripheral side edge of the core between a surface of the core and an adjoining peripheral border of the core. The invention moreover relates to a method for producing a plate-shaped element for supporting or carrying an object, including a core of foamed plastic having a generally rectangular shape, said core being, in particular holohedrally, covered with a plastic sheet or film of high-impact material at least on its two surfaces, comprising the steps:
  providing two heated or softened plastic sheets or films covering the surface of the core and whose dimensions exceed the dimensions of the surface of the core;
  clamping or sealing the peripheral borders of the sheets outside the core;
  connecting the plastic sheets in the region of a peripheral side edge of the core between a surface of the core and an adjoining peripheral border of the core;
  optionally removing sheet portions projecting beyond the connection site on the periphery of the core.

PRIOR ART

A plate-shaped element in the form of a pallet and a method for making the same are, for instance, known from EP-B 1 500 599. Similar embodiments can, moreover, be taken from U.S. Pat. No. 5,401,456 or EP-A 0 520 508.

Those known embodiments are aimed to produce pallets with cores made of foamed plastics, in particular polystyrene, wherein, in consideration of the poor strength properties known of foamed polystyrene, a plastic sheet of high-impact or impact-resistant material is each provided on at least the surfaces in order to provide the elevated strength properties required of a pallet. In those known embodiments, the connection of plastic sheets provided on the respective surfaces of the plate-shaped element is generally accomplished in that a first sheet or slab is introduced into a first mold adapted to the contour of the plate-shaped or plate-like element to be coated, thus covering a first surface or side and at least half of the edge or half of the peripheral border, wherein a second sheet or film or slab is likewise introduced into a respective mold, thus covering the other surface and also half of the edge so that a connection between these sheets is effected at the level of half of the peripheral border of the plate-shaped element. For its production, a multi-step method is proposed, which, in particular, involves the drawback that the positioning of the slabs or sheets within the contour-adapted molds each as far as to half of the peripheral border, and a connection on this site, are only feasible with high additional expenditures, thus extremely complicating production. In addition, it is usually not feasible to adjust and position the sheets covering the surfaces of the plate-shaped element within the molds in such a precise manner as to actually achieve a sufficient and reliable coverage of the sheets or slabs at half the height of the peripheral border or surrounding border according to the prior art. In the proposed, known methods, it is, moreover, normally impossible to achieve a weld of the two cover sheets in the middle of the surrounding border with the two sheets overlapping each other, which constitutes a weak point of that known product and method. In addition, it is disadvantageous that molds each adapted to the contour of the plate-shaped element to be coated have to be used to enable the attachment of the sheets or slabs to the plate-shaped element or its core. A change in the form or shape of the element to be coated would, thus, also call for a change of the mold or mechanical support to be employed.

Moreover a plate-shaped or plate-like element as a pallet and a method for producing of the kind mentioned above can be taken, for example, from US 2005/0263044 A1.

SUMMARY OF THE INVENTION

The present invention aims to provide a plate-shaped or plate-like element of the initially defined kind while avoiding the above-mentioned drawbacks, in order to provide a plate-shaped element offering an accordingly high strength and resistivity by simple and reliable method steps.

To solve these objects, a plate-shaped element of the initially defined kind is essentially characterized in that the core is designed with a peripheral, recessed depression in the region of the side edge of the connection between the two plastic sheets covering the surfaces. Such a peripheral, recessed depression provides an appropriate reception site for the connection of the sheets so as to ensure a flush appearance of the plate-shaped element without curvatures or elevations, in particular in the region of the connection, substantially irrespective of the connection to be provided in the region of the side edge. Due to the fact that a connection of the plastic sheets or foils covering the core on its two surfaces, in particular sheets or films of high-impact or impact-resistant material, is formed in the region of a peripheral side edge between a surface of the core and an adjoining peripheral or surrounding edge, reliable positioning of the connection in the recess or depression is feasible, which can also be made at reduced expenditures and, in particular, in a rapid and reliable manner. The sheets required for covering the surfaces and the peripheral border can be provided in suitable sizes so as to provide a reliable connection even in the region of the side edge or the depression, which is defined as an intersection between an adjoining core surface having a generally rectangular shape and a border or peripheral border adjoining the same at a substantially normal angle. By providing a plastic sheet of an impact-proof or high-impact material, in particular holohedrally, on the two surfaces and on the adjoining border or peripheral border or surrounding side face departing from a surface, a plate-shaped element will be provided, which is holohedrally enclosed over its entire surface or entire periphery, even on its edge. The connection between the plastic sheets provided on the respective surfaces can be effected by gluing, welding or the like, wherein it is, moreover, feasible to renounce, in particular, the use of molds adapted to the contour of the plate-shaped element core to be coated, as required in the prior art.

According to a preferred embodiment, it is provided that the plastic sheets are arranged and/or connected in an at least partially overlapping manner in the region of their connection, the preferably provided, at least partial overlap ensuring an appropriate reinforcement in the region of the side edge in the connection area of the two plastic sheets. In this respect, it may, for instance, be provided that a sheet is folded back into itself and covered by the second sheet, wherein both sheets are subsequently welded together so as to produce a strong and resistant edge. A reliable reception of the connection sites of the sheets covering the surfaces and the peripheral border, which, when providing at least one partial overlap, have optionally larger cross sections in order to achieve a sufficiently firm connection, is easily achievable in the depression or recess being proposed according to the invention.

It is, thus, feasible according to the invention, by using a core of foamed plastic usually having a low weight and usually having a comparatively low strength, to produce an accordingly resistant plate-shaped element for supporting or carrying an object by providing said plastic sheets of an impact-proof or high-impact material, wherein an accordingly high supporting strength or resistivity will be ensured even in the connection area by the connection site being preferably designed to be reinforced and overlapping.

According to a further preferred embodiment, it is proposed that the core is made of foamed polystyrene, EPE, EPP and/or alloys or copolymers thereof so as to provide an accordingly light-weight plate-shaped element.

In order to achieve the required strength or resistivity, it is, moreover, proposed that the sheet is made of polystyrene, polyethylene and/or mixtures of polystyrene and polyethylene, as in correspondence with a further preferred embodiment of the plate-shaped element according to the invention. In this context, it is proposed according to a further preferred embodiment that a mixture of polystyrene and polyethylene for the sheet contains a maximum of 30% of polyethylene. Another preferred embodiment is proposed, in which a sheet is made of a copolymer based on styrene and butadiene.

In order to achieve an appropriate adhesion between the core and the sheets as well as enable the sheathing or sheathing of the core at appropriate temperatures without affecting the core structure, it is proposed according to a further preferred embodiment that the sheet has a glass transition temperature of from 100 to 160° C.

In order to achieve the desired material and strength properties, it is, moreover, provided that the sheet is a multi-layer and, in particular, co-extruded sheet of polystyrene and/or various polystyrene alloys such as, e.g., butadiene or polyethylene, as in correspondence with a further embodiment of the plate-shaped element according to the invention.

In order to achieve the respective resistivity and strength properties, it is, moreover, proposed that the sheet has a thickness of from 0.3 to 4 mm, in particular 1 to 2.5 mm, as in correspondence with a further preferred embodiment of the plate-shaped element according to the invention. The appropriate choice of both the material and the thickness of the sheet will enable the desired resistivity properties of the plate-shaped element to be adjusted accordingly, for instance, as a function of the weight to be taken up or supported, of at least one object to be accommodated.

According to a further preferred embodiment, it is, moreover, proposed that both the core and the sheet are made of polystyrene. By providing such pure-grade plate-shaped elements, accordingly increasingly restrictive disposal or recycling options can be met, since the pertinent regulations allow plastic elements made of a single material and marked accordingly to be subjected to usually lower-cost recycling processes, and duties optionally prescribed in connection with the production and/or distribution or use of such plastic elements are accordingly reduced for pure-grade elements.

As already indicated above, the plate-shaped element according to the present invention can be provided with an accordingly high resistivity, wherein it is proposed according to a preferred embodiment that the plate-shaped element has a dynamic load strength of at least 1000 kg. Such breaking strengths allow for the manufacture of accordingly durable plate-shaped elements for supporting or receiving at least one object, e.g. for transport purposes. Load testing is, for instance, performed according to the EN ISO 8611-1 standard while observing strength values to be tested which are indicated therein. The maximum dynamic load-bearing capacity usually amounts to 50% of the measured dynamic breaking load such that a dynamic breaking load of 2000 kg will (have to) be reached at a dynamic load-bearing capacity of 1000 kg.

As already pointed out above, a plate-shaped element for supporting or receiving at least one object can be provided at a low weight, wherein, in this context, it is preferably proposed according to the invention that the plate-shaped element has a density of from 12 g/L to 90 g/L, in particular 25 g/L to 70 g/L. Such a low weight enables the provision of plate-shaped elements optionally having larger dimensions, without excessively increasing the overall weight.

According to a further preferred embodiment, it is, moreover, proposed according to the invention that the plate-shaped element comprises a plurality of projecting support elements, in particular feet, on one of its surfaces so as to make available a pallet-like plate-shaped element according to the invention by providing such support elements or feet. By the option to provide a plate-shaped element having an accordingly low weight in the form of a pallet, it is, for instance, possible to replace currently used pallets of wood, the pallet according to the invention, or the plate-shaped element according to the invention, enabling a reduced weight at identical strength properties.

For the proper support of an object optionally having an increased weight, it is, moreover, provided that a plurality of feet are arranged in a substantially parallel manner, as in correspondence with a further preferred embodiment of the plate-shaped element according to the invention.

For a uniform support over a plate-shaped element surface optionally having larger dimensions, it is, moreover, preferably proposed that a plurality of feet extend substantially over a total dimension and each substantially in parallel with an edge of the surface.

With conventional pallets it is known that, despite a plurality of support elements or feet, these are provided with a defined support surface substantially even on their surface facing away from the reception surface for an object to be transported or accommodated, such support surfaces being required for the reliable positioning of such a plate-shaped element or pallet on a base optionally formed by planar elements in different levels.

For the arrangement of a plate-shaped element according to the invention, in particular in the form of a pallet, it is proposed according to a preferred embodiment that the feet are designed with recessed or depressed regions on their facing-away surfaces connected with the surface. Such recessed or depressed regions, for instance, enable the arrangement of such a plate-shaped element with an object disposed thereon on a shelf which, as opposed to known configurations, will do with carriers or beams merely arranged in correspondence with the depressed or recessed regions of the plate-shaped element, whereby a holohedral base surface is, thus, no longer required for the proper storage of such a plate-shaped element, so that shelf constructions too can be accordingly simplified while increasing the shelvability of such a plate-shaped element according to the invention.

For as universal a purpose of use as possible, it is, moreover, provided that a plurality of feet are arranged in relatively perpendicular lines and columns in a manner known per se, as in correspondence with a further preferred embodiment of the plate-shaped element according to the invention.

In order to achieve an appropriate strength and resistivity also of the support elements or feet, it is, moreover, preferably proposed that the feet are likewise covered or sheathed by a plastic sheet, and that the connection with the plastic sheet covering the core is provided in the region of the side edge located on the surface comprising the adjoining feet.

For the reliable arrangement or mounting of an object to be arranged on the plate-shaped element, it is, moreover, provided in a preferred manner that the core, on its surface facing away from the feet, is formed with at least one depression or recess adapted to the object to be supported so as to enable the positioning of said object, in particular, in a manner largely secured against slipping or sliding by at least one such depression or recess.

According to a further modified embodiment, it is preferably proposed according to the invention that the core is formed with guiding grooves or recesses, in particular for receiving fixing elements, thus readily enabling additional fixing elements, for instance strap-shaped or belt-shaped fixing elements, to be directly fixed to the plate-shaped element for securing the object to be arranged on, or supported by, the plate-shaped element.

When forming a pallet by providing additional support elements or feet, it may preferably be additionally provided, for the reinforcement of subregions, that the sheet(s) is/are formed with different thickness(es) and/or several layers in subregions, wherein subregions, for instance, engaged by lifting elements or forks of a fork lift for transporting such a pallet are optionally designed to be accordingly reinforced in order to withstand optionally elevated forces in said regions.

To solve the objects mentioned in the beginning, a method of the initially defined kind is, moreover, substantially characterized by:
evacuating the hollow space formed between the plastic sheets by applying a vacuum source before connecting the plastic sheets or films.

It is, thus, altogether feasible to provide a simple and reliable manufacturing process, with the proper and safe attachment of the heated or softened plastic sheets to the surface of the core being achievable by simply evacuating the hollow space formed between the plastic sheets upon application of a vacuum source according to the invention. In addition, the appropriate positioning of the connection area, in particular in the region of the application of at least one vacuum source, allows for the achievement of a reliable connection between the plastic sheets covering the surfaces of the core and the adjoining peripheral border. After having completed or formed the connection in the region of the side edges, it is, moreover, feasible in a simple manner to remove, e.g. cut or tear off, possibly projecting or protruding plastic sheet material in the region of the side edge. By, in particular, simultaneously providing two heated or softened plastic sheets, the course of procedure for producing a plate-shaped element according to the invention can be accelerated accordingly. When simultaneously providing two heated or softened plastic sheets, an evacuation of the hollow space formed between the plastic sheets will be immediately feasible, wherein the additional use of molds adapted to the contour of the core to be coated can be renounced, as already pointed out above.

In order to ensure an accordingly simple and reliable process control while achieving a proper connection between the surfaces of the core to be coated and the sheets as well as avoiding any adverse effect on the condition of the core, it is, moreover, proposed in a preferred manner that heating of the sheets is effected to a temperature ranging between 90 and 190° C., in particular 100° C. and 160° C.

For the proper attachment of the plastic sheets to the core of the plate-shaped element to be covered, it is, moreover, proposed that a differential pressure or vacuum of from 0.5 to 0.9 bar, in particular 0.7 to 0.8 bar, is applied, as in correspondence with a further preferred embodiment of the method according to the invention.

Bearing in mind the present softened or heated sheets and the vacuum to be applied, it is feasible to realize a connection between the sheets and the core within an accordingly short period of time, wherein it is proposed according to a further preferred embodiment of the method according to the invention that a vacuum is applied for a period of less than 25 s, in particular 15 s. It is, thus, apparent that the manufacture of plate-shaped elements or pallets having accordingly high strengths or resistivities is feasible with short cycle times.

In order to ensure as uniform an evacuation as possible in the connection area or clamping site or sealing site between the plastic sheets to be connected, substantially over the entire periphery of the plate-shaped element core to be sheathed, it is, moreover, proposed that a vacuum is applied via tubular or slot-shaped hollow means arranged about the periphery of the core between the sheets during clamping or sealing, said hollow means, for the formation of partially overlapping edge areas in the region of the connection of the sheets, being progressively removed from the area of connection between the two sheets immediately before terminating the evacuation step, as in correspondence with a further preferred embodiment of the method according to the invention.

In the event of, in particular, large-area plastic sheets and extended evacuation periods possibly involved, it is additionally proposed, in order to achieve within comparatively short times an accordingly reliable attachment of the sheets to the core to be sheathed or covered, that the sheets are additionally heated during evacuating, as in correspondence with a further preferred embodiment of the method according to the invention.

SHORT DESCRIPTION OF THE DRAWINGS

In the following, the invention will be explained in more detail by way of exemplary embodiments schematically illustrated in the accompanying drawing. Therein:

Figure 2A:
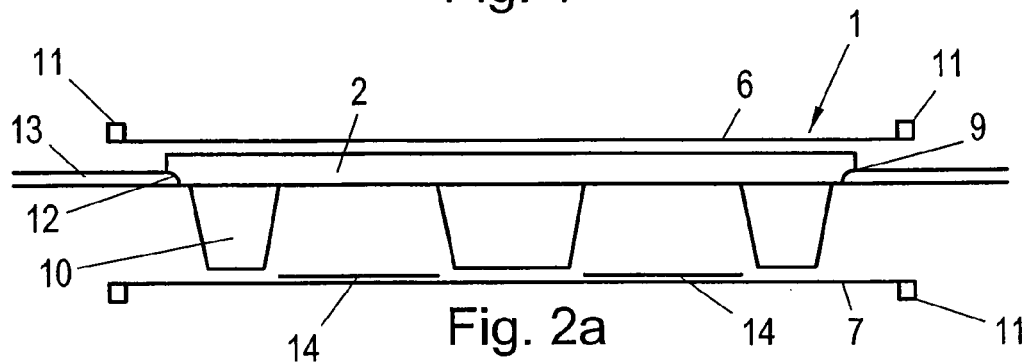
FIGS. 2a to 2d depict different steps of the method according to the invention for producing a plate-shaped element according to the invention, the plate-shaped element illustrated in FIGS. 2a to 2d being provided with support elements or feet.
Figure 2B:
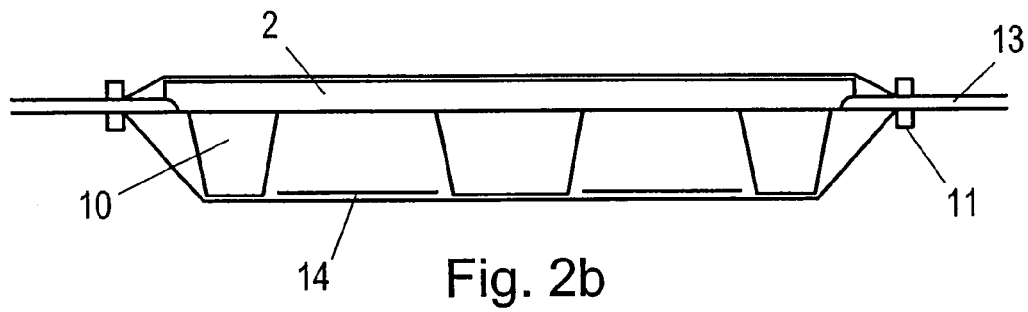
Figure 4:
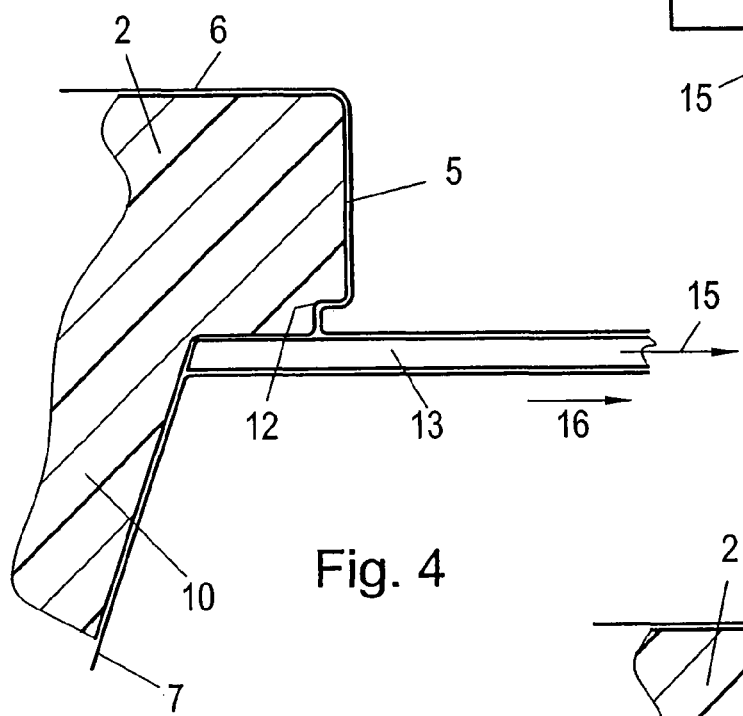
Figure 5:
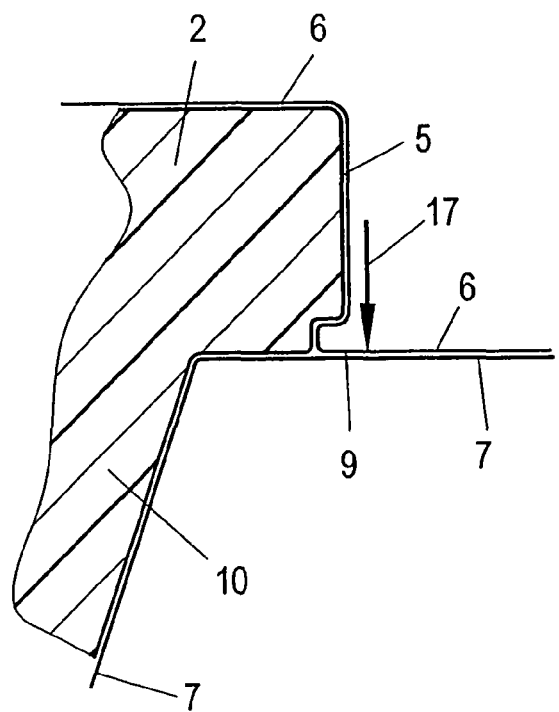
Figure 6A:
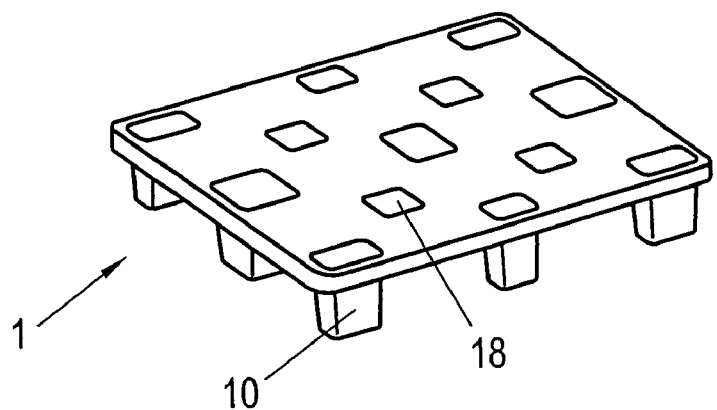
Figure 6B:
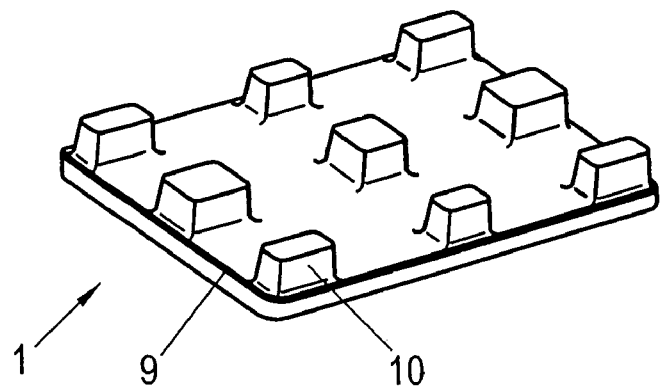
Figure 7:
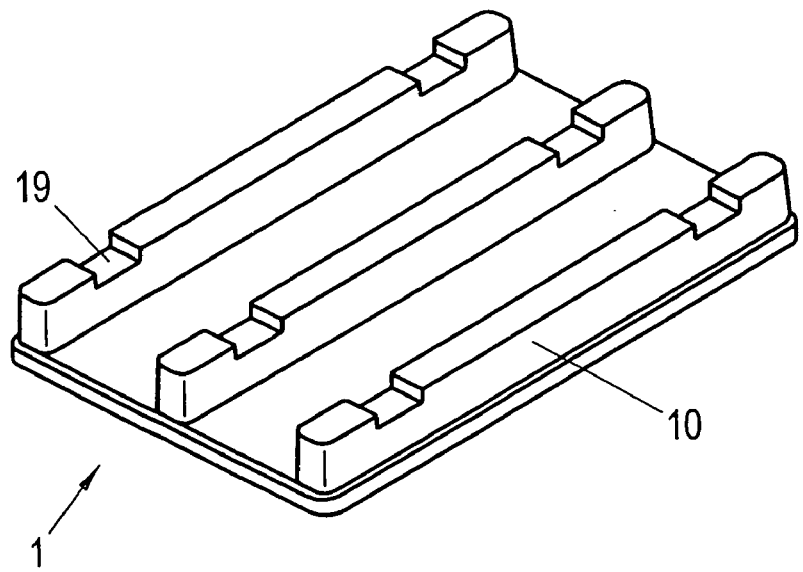
Figure 8:
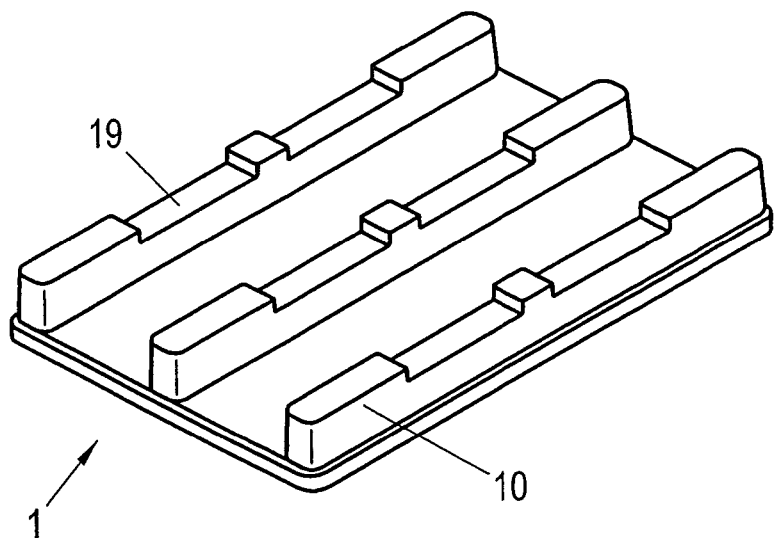
Figure 9:
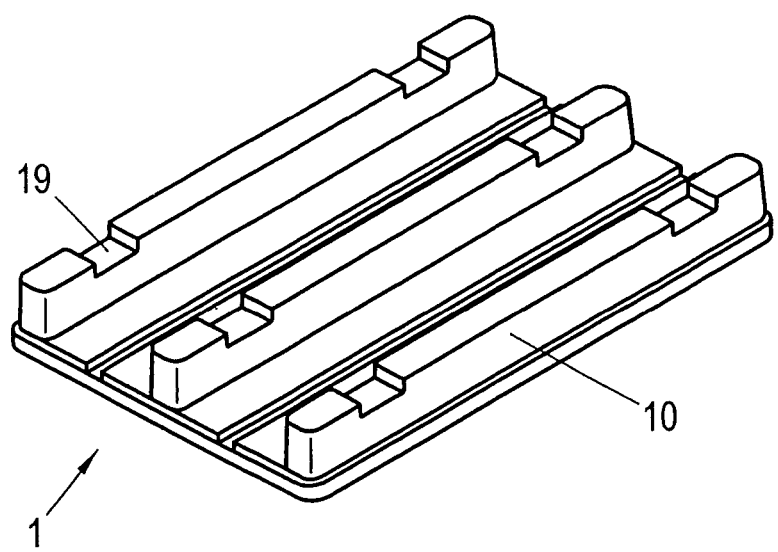
Figure 10:
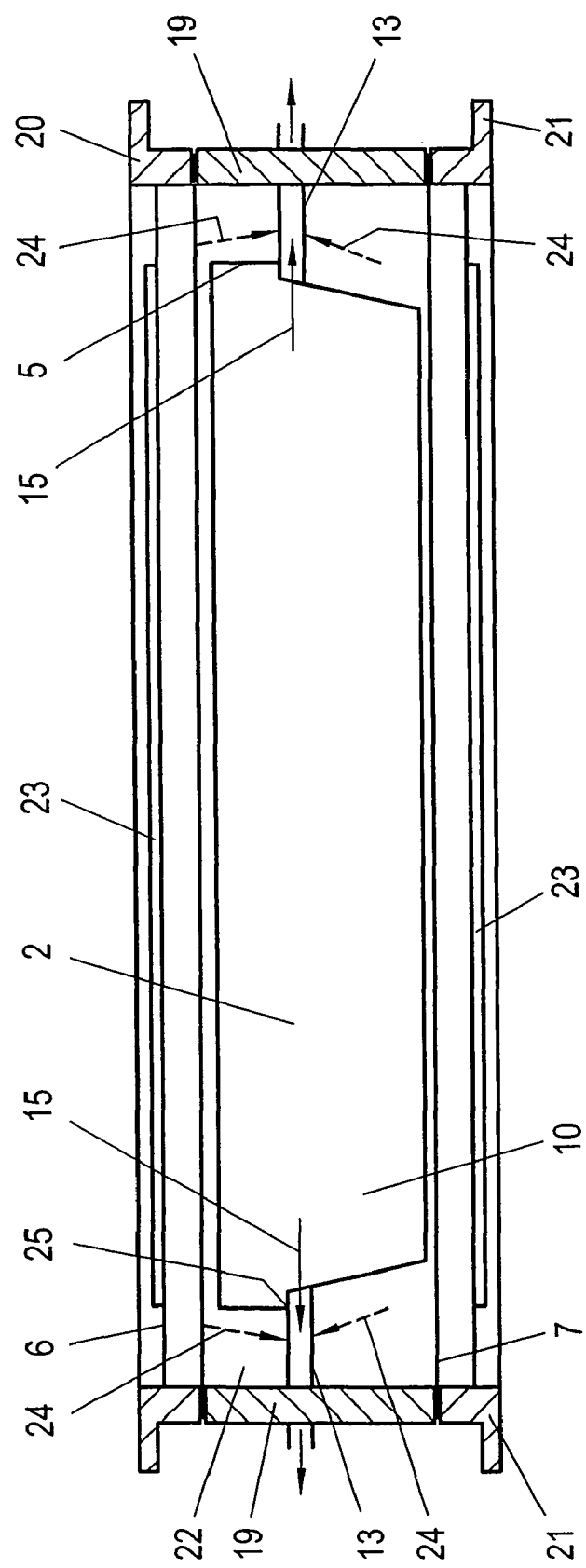

FIG. 4, on an enlarged scale, is a partial illustration of the region where the vacuum means for arranging and fixing two plastic sheets each during the evacuation procedure are provided;

FIG. 5, in an illustration similar to that of FIG. 4, illustrates the arrangement of the plastic sheets after the removal of the vacuum device and, hence, completion of the connection of the plastic sheets covering the core;

FIGS. 6a and 6b are a perspective view on the upper surface and a bottom view of a modified embodiment of a plate-shaped element according to the invention;

FIGS. 7, 8 and 9 are views similar to that of FIG. 6b, of the bottom regions of further modified embodiments of plate-shaped elements according to the invention having different support element or foot configurations for forming a plate-shaped element into a pallet; and FIG. 10, in an illustration similar to that of FIG. 2b, depicts a modified embodiment of a method according to the invention for producing a plate-shaped element of the invention.

DETAILED DESCRIPTION OF PREFERRED EMBODIMENTS

Figure 1:
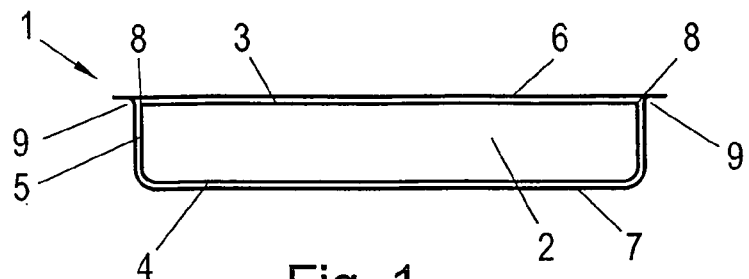
FIG. 1 is a schematic sectional view through a first embodiment of a plate-shaped or plate-like element according to the invention.

FIG. 1 schematically illustrates a plate-shaped or plate-like element 1 comprised of a core 2 of foamed plastic, for instance polystyrene, said core 2 being, in particular holohedrally, covered with plastic sheets or films 6 and 7 both on its surfaces 3 and 4, respectively, and on its peripheral border or peripheral edge or a surrounding side face 5 to achieve an appropriate strength or resistivity, wherein it is apparent from the schematic illustration of FIG. 1 that the plastic sheets 6, 7 are connected in the region of an edge or side edge 8 between the surface 6 and the peripheral border or surrounding side face 5 at a connection denoted by 9.

The connection 9 provided in the region of the side edge 8 enables the reliable positioning of the sheets 6 and 7, the arrangement of the connection 9 in the region of the side edge 8 also ensuring a reliable connection between the plastic sheets 6, 7 so as to sheath the core 2 completely.

In the following Figures, the same reference numerals are each retained for identical elements despite partially varying designs.

It can thus be taken from the method steps illustrated in FIGS. 2a to 2d that a core again denoted by 2 is provided with a plurality of support elements or feet generally denoted by 10.

To form the sheathing to be produced by the plastic sheets 6 and 7, it is apparent from FIG. 2a that these sheets 6 and 7 are brought into the region of the core 2 to be sheathed as well as the support elements 10, wherein clamping sites 11 are indicated on the outer edges of the plastic sheets 6 and 7. In addition, it can be seen in the region of the edge 9, which is recessed or comprises a depression 12 in the configuration depicted in FIGS. 2a to 2d, that a vacuum from a vacuum source not illustrated in detail is applied to this region via slotted elements 13, which will be explained in more detail below.

In FIGS. 2a to 2d it is, moreover, indicated that the plastic sheet 7 in subportions 14 is reinforced, comprising an additional plastic sheet layer, said subportions 14 upon completion of the sheathing by the plastic sheets 6 and 7 providing reinforced portions 14, which, when using the plate-shaped element 1 as a pallet, are able to take up elevated forces possibly occurring during the transport of the pallet, and an object (not illustrated) to be arranged thereon, by fork lifts or similar devices.

Figure 2C:
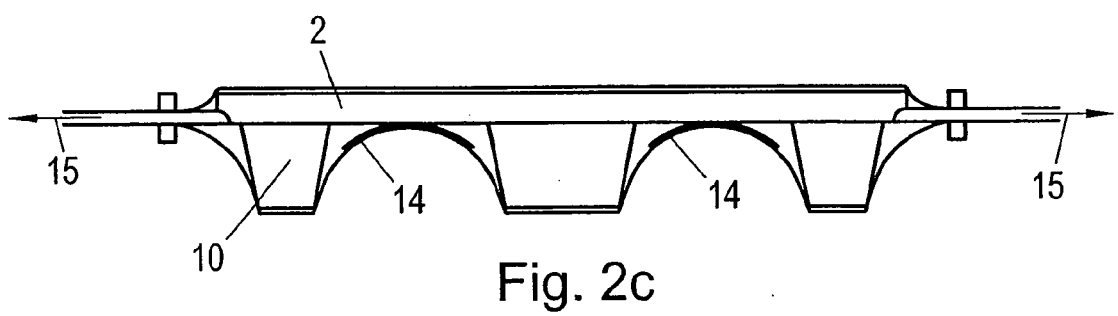
Figure 2D:
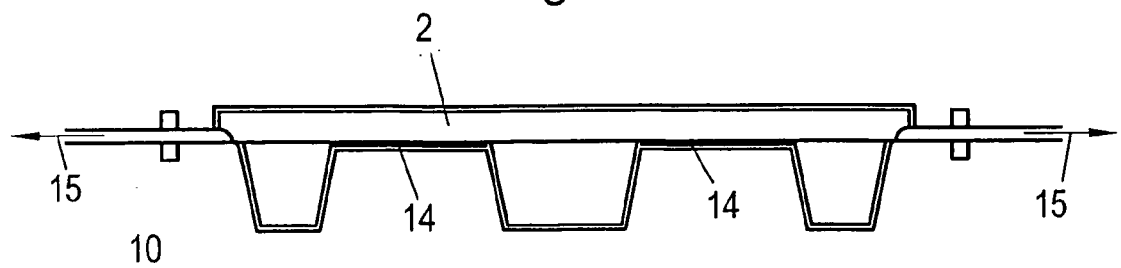

To connect the plastic sheets 6 and 7 with the core 2 and to sheathe the support elements or feet 10, the plastic sheets 6 and 7 are heated or softened by heating means (not illustrated) and, in particular, provided simultaneously, whereupon the clamping sites 11 are substantially brought into mutual abutment so as to surround the slotted means 13 as indicated in FIG. 2b, whereupon the hollow space formed between the sheets 6 and 7 and enclosing the core 2 to be sheathed as well as the support elements or feet 10 arranged thereon is evacuated by applying an underpressure or vacuum in the sense of arrow 15 in FIGS. 2c and 2d such that, with the progressing application of vacuum 15, an attachment of sheets 6 and 7 to the core 2 and the support elements 10 is effected. In FIG. 2c, an intermediate step during the evacuation procedure is indicated, while FIG. 2d shows the completed, attached position of the plastic sheets 6 and 7 to the core 2 and the support elements or feet 10.

From FIG. 2, it is apparent that the use of molds adapted to the contour of the core 2 to be coated, as well as the indicated feet 10, or of mechanical supports can be completely obviated for the proper attachment of the sheets 6 and 7, the attachment of the sheets 6 and 7 to the core 2 as well as the feet 10 being merely effected by the application of an underpressure or vacuum to the interior of the hollow space defined by the sheets 6 and 7 and accommodating the core 2.

Figure 3:
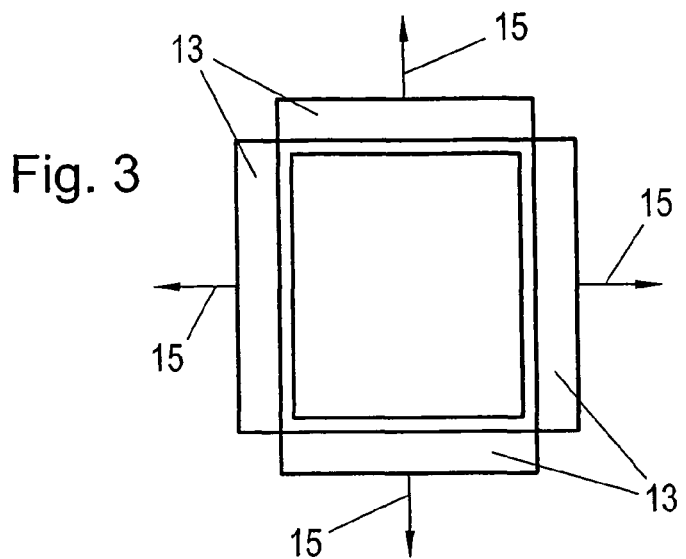
FIG. 3 is a simplified schematic top view on a plate-shaped element during the procedure of arranging and connecting plastic sheets or films covering or sheathing the core of the plate-shaped element, with slot-shaped vacuum means arranged about the periphery of the plate-shaped element being schematically indicated.

From the schematic illustration according to FIG. 3, it is apparent that slot-shaped means 13 are arranged substantially about the entire periphery of the core 2, by which an underpressure or vacuum is again applied in the sense of arrows 15. The means 13, on the one hand, serve to evacuate in the sense of arrows 15 and, on the other hand, to support the core 2 during the coating procedure. Such an evacuation substantially about the entire periphery in the region of the peripheral border 5 of the core 2, thus, ensures the reliable evacuation of the hollow space defined between the plastic sheets 6 and 7, the clamping sites indicated in FIGS. 2a to 2d having been omitted from FIG. 3 for the sake of simplicity and clarity.

FIG. 4, on an enlarged scale, illustrates in detail the positioning of a tubular or slotted means 13 in the region directly below the side border 5 or depression 12, an evacuation in the sense of arrow 15 being indicated as well. FIG. 4 substantially depicts the state represeted in FIG. 2d, according to which the sheets 6 and 7 are substantially in abutment both on the core 2 and on the illustrated subregion of the support element or foot 10. At this stage, a retraction of the slot-shaped element 13 in the sense of arrow 16 is effected such that, in particular, sheet 6 and, subsequently, also sheet 7 will mutually overlap in the region of the depression or peripheral recess 12 in the region of the side edge at the end of the peripheral border 5, whereby, in this overlapped state, a connection is effected between the sheets as indicated in detail in FIG. 5. The region of the overlapping connection between the sheets 6 and 7 is again denoted by 9. After having completed the connection 9 in this overlapping region, the remaining residues of the sheets 6 and 7 are separated as indicated by cutting means 17. From FIG. 5, it is apparent that a sheet 6 is refolded or folded back into itself while covering the second sheet 7, the two sheets 6 and 7 being subsequently welded together so as to form a strong or reinforced edge after the separation of the residuals of sheets 6 and 7.

The arrangement of the connection site 9 in the region of the edge between the peripheral border 5 and the core surface to be covered allows for the achievement of a reliable connection between the sheets 6 and 7 so as to ensure proper strength even in the region of the connection 9.

The following Figures are partially perspective views of different, modified embodiments of plate-shaped elements each again denoted by 1 and each in the form of a pallet.

From the embodiment according to FIGS. 6a and 6b, it is apparent that a plurality of support elements or feet again denoted by 10 are arranged in rows and columns so as to enable the handling of such a plate-shaped element or pallet 1 with an object (not illustrated) to be accommodated or transported thereon, for instance, by a stacker truck or fork lift. In the illustration according to FIG. 6a, it is, moreover, indicated that the plate-shaped element 1, on its surface facing away from the feet or support elements 10, comprises additional depressions or recesses 18, which are, for instance, adapted to corresponding fixing elements or feet of an object to be mounted thereon, so that, by arranging an object on the plate-shaped element 1 or pallet, the former will be secured against shifting by the additionally provided reception recesses.

In the embodiment represented in FIG. 7, modified support elements 10 in the form of continuous support elements extending substantially over a dimension of the plate-shaped element 1 are illustrated, said support elements having additional depressions or recesses 19 in their end regions, as is apparent from FIG. 7. Such additional depressions or recesses 19, for instance, enable such a plate-shaped element 1 to be mounted on a shelf construction merely comprising accordingly adapted carrier or beam structures, without said shelf structure having to be equipped with substantially full-area storage or stacking surfaces.

In a similar manner, further embodiments of a plate-shaped element 1 each formed by a pallet are illustrated in FIGS. 8 and 9, wherein support elements or feet 10 substantially extending over a longitudinal extension are again provided, which are again formed with depressions or recesses 19 in adaptation to different bearing constructions of shelves in order to achieve an appropriate shelvability by the respective depressions or recesses 19.

In addition, it is indicated in the embodiment represented in FIG. 9 that additional guiding grooves 20 are provided between the support elements or feet 10 in the region of the surfaces of the core 2, which guiding grooves may, for instance, be used to receive, in particular belt-shaped or strap-shaped, fixing means for fixing objects to be immobilized on the plate-shaped element.

From the modified embodiment depicted in FIG. 10, it is apparent that a core again denoted by 2 is supported via means again denoted by 13, said means 13 comprising slot-shaped or tubular passage openings for creating an underpressure or vacuum in the sense of arrows 15.

The plastic sheets 6 and 7 provided for coating the core 2 in this embodiment are mounted and clamped in a suitable holding means 19 and 20 or 21, respectively, in a manner that the sheets 6 and 7 will be clamped and sealed in their peripheral regions when closing the holding elements 19, 20 and 21. A hermetically sealed space 22 is thus provided between the sheets 6 and 7 and the holding means 19, which is subsequently evacuated in the sense of arrow 15 by the means 13 comprising tubular or slot-shaped openings, so that the sheets 6 and 7, which are, for instance, heated by heating means integrated in the holding means 20 and 21 and schematically indicated at 23, will be attached to the contour of the core 2, and optionally feet 10, by the application of a vacuum, as is illustrated for the embodiment of FIG. 2, for instance, in FIGS. 2c and 2d.

If required, the means 13, which are also used to support the core 2, may optionally comprise additional passage openings, via which an additional evacuation of the hollow space 22 stretched between the sheets 6 and 7 is effected, for instance in the sense of broken-line arrows 24.

Thus, also in the embodiment illustrated in FIG. 10, a connection of sheets 6 and 7 is effected in the region of the support on the edge 25 of the core 2 so as to ensure an overall sheathing of the core 2 by the sheets 6 and 7.

Similarly, as in the preceding embodiment and as illustrated, in particular, in FIGS. 4 and 5, the means 13 which, through their tubular of slot-shaped openings, serve both to evacuate the interior 22 and to support and position the core 2 between the sheets 6 and 7 are removed after having attached the sheets 6 and 7 to the outer contour of the core 2 to be coated, so that a connection of the sheets 6 and 7 is effected in the region of the edge 25 by further evacuation. If required, residual portions of the sheets 6 and 7 may be removed after connection, in particular welding, as discussed in the preceding embodiments.

The schematic side view of a core 2 represented in FIG. 10 may constitute a side view of the plate-shaped element 1 illustrated in FIGS. 7 to 9, with throughgoing or longitudinally extending feet 10 being indicated.

In order to obtain a plate-shaped element having an accordingly low weight, yet exhibiting the required stiffness or strength, the core of the plate-shaped element 1 is, for instance, made of foamed polystyrene, EPE, EPP and/or alloys or copolymers thereof.

While such a core 2 of foamed plastic, as a rule, has a relatively low strength or resistivity, sufficient strength of the plate-shaped element or pallet 1 will be ensured by providing a sheet 6, 7 of an accordingly impact-proof or high-impact material, which will be connected therewith during the connection procedure illustrated, for instance, in FIGS. 2 and 3. As a function of the strengths to be achieved, or loads to be taken up, sheets 6, 7 having, for instance, thicknesses of between 0.3 and 4 mm, in particular about 1 to 2.5 mm, can be used. Where low loads are to be taken up, comparatively thin sheets 6, 7 will, for instance, serve primarily as protection means against dirt, while sheets 6, 7 having thicknesses of at least 1 mm will, for instance, provide the desired strength for accommodating accordingly higher loads.

Sheet materials for the sheets or foils 6, 7, for instance, include high-impact or impact-resistant polystyrene, polyethylene and/or mixtures of polystyrene and polyethylene, wherein multi-layer and, in particular, co-extruded sheets of polystyrene and polyethylene will, for instance, be used to achieve the desired strength properties.

If both the core 2, and also support elements or feet 10 to be optionally attached thereto, and the sheets 6 and 7 are made of polystyrene, an accordingly pure-grade plate-shaped element 1 will be provided such that its reusability or recycling ability will be enhanced, and/or duties to be paid will be reduced considering the fact that a pure-grade and, hence, readily recyclable plate-shaped element 1 can be provided.

When forming the plate-shaped element 1 as a pallet including support elements or feet 10 adjoining the core 2, as indicated in FIGS. 2a to 2d as well as in FIGS. 6a to 9 and 10, the dimensions of the substantially or generally rectangular or oblong core 2 may range between a minimum size of 400× 600×50 mm and a maximum size of usually 1500×1500×200 mm. Suitable intermediate sizes may be made available as a function of the requirements of at least one object to be transported or supported by the plate-shaped element or pallet 1.

In particular as a function of the loads to be taken up, or the forces to be expected, for instance, during transportation, the plate-shaped element 1 may have a density of, in particular, 25 g/L to 70 g/L so as to provide an accordingly light-weight pallet or plate-shaped element 1 having a comparatively low weight, for instance, as compared to known transport supports or pallets made, for instance, of wood.

As already pointed out above, high-impact polystyrene, a co-extruded sheet material comprising an upper layer and a lower layer each made of a styrene-butadiene copolymer and a high-impact polystyrene, a mixture of a styrene-butadiene block copolymer with high-impact polystyrene and similar sheet compositions may, for instance, be used for the sheets 6, 7.

Such a structure of the core 2 of polystyrene and such sheets 6, 7 allow for the accommodation of loads of, for instance, 1000 to 1800 kg of a dynamic load and 2000 to 6000 kg of a static load at a core size of the plate-shaped element 1 of, for instance, 1200×1000 mm.

With smaller dimensions of the core 2, for instance, of about 1000×750 mm, static loads of up to approximately 3000 kg and dynamic loads of up to approximately 800 to 1000 kg can be taken up.

In addition, such material combinations allow for the achievement of dynamic breaking loads of up to 3600 kg.

In the event of evacuation procedures possibly requiring extended periods of time, as in accordance with the method steps represented in FIGS. 2 and 3, additional heating of the plastic sheets 6 and 7 to be brought into abutment on the core 2 and the optionally present support elements or feet 10 may also be provided during the evacuation procedure, as is, for instance, indicated by the heating means of FIG. 10.

The invention claimed is:

1. A method for producing a plate-shaped element for supporting or carrying an object, including a core of foamed plastic having a generally rectangular shape, said core being holohedrally covered with a plastic sheet or film of high-impact material at least on its surfaces, said method comprising the steps:

providing two heated or softened plastic sheets or films covering a surface of the core and whose dimensions exceed dimensions of the surface of the core;

clamping or sealing peripheral borders of the sheets outside the core;

connecting the plastic sheets in a region of a peripheral side edge of the core between a surface of the core and an adjoining peripheral border of the core;

evacuating a hollow space formed between the plastic sheets by applying a vacuum source before connecting the plastic sheets; and applying a differential pressure or vacuum via tubular or slot-shaped hollow means arranged about the periphery of the core between the sheets during clamping or sealing, said hollow means, for the formation of partially overlapping edge areas in the region of the connection of the sheets, being progressively removed from the area of connection between the two sheets immediately before terminating the evacuation step.

2. The method according to claim 1, wherein heating of the sheets is effected to a temperature ranging between 90° C. and 190° C.

3. The method according to claim 1, wherein a vacuum of from 0.5 to 0.9 bar is applied.

4. The method according to claim 1, wherein a vacuum is applied for a period of less than 25 s.

5. The method according to claim 1, wherein the sheets are additionally heated during evacuating.

* * * * *

UNITED STATES PATENT AND TRADEMARK OFFICE
CERTIFICATE OF CORRECTION

PATENT NO.      : 8,381,663 B2
APPLICATION NO. : 12/452584
DATED           : February 26, 2013
INVENTOR(S)     : Schiava et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this
First Day of September, 2015

Michelle K. Lee
*Director of the United States Patent and Trademark Office*